Figure 1A:
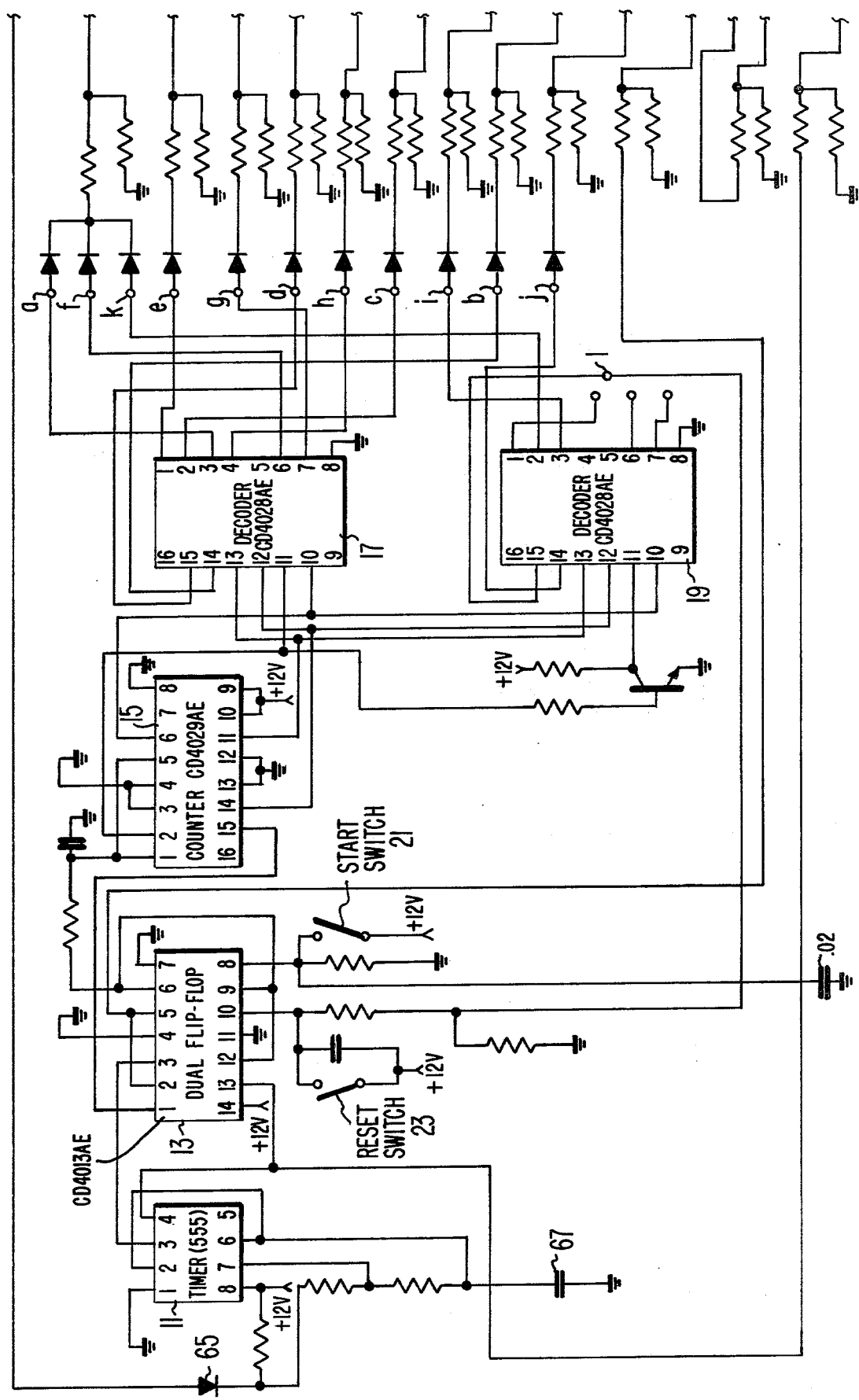

United States Patent [19]

Valachovic

[11] 4,189,746
[45] Feb. 19, 1980

[54] METHOD AND APPARATUS FOR DETERMINING FOCUS CONDITIONS

[75] Inventor: John Valachovic, New Brunswick, N.J.

[73] Assignee: RCA Corporation, New York, N.Y.

[21] Appl. No.: 889,353

[22] Filed: Mar. 23, 1978

[51] Int. Cl.² .............................................. G11B 7/00
[52] U.S. Cl. .......................... 358/128.5; 179/100.3 P; 179/100.3 V; 356/123
[58] Field of Search ............................ 358/128, 129; 179/100.3 P, 100.3 V, 100.3 C, 100.3 D; 250/201; 356/123, 125; 365/124

[56] References Cited

U.S. PATENT DOCUMENTS

| | | | |
|---|---|---|---|
| 3,999,008 | 12/1976 | Boawhuis et al. | 179/100.3 V |
| 4,010,318 | 3/1977 | Riddle | 358/178 |
| 4,074,313 | 2/1978 | Reisner et al. | 358/128 |
| 4,078,171 | 3/1978 | Stauffer | 250/201 |
| 4,090,031 | 5/1978 | Russell | 358/128 |
| 4,094,010 | 6/1978 | Pepperl et al. | 358/128 |

Primary Examiner—Bernard Konick
Assistant Examiner—Donald McElheny, Jr.
Attorney, Agent, or Firm—E. M. Whitacre; J. S. Tripoli; J. E. Roehling

[57] ABSTRACT

Focus accuracy of a radiant energy recording beam is determined by recording test signals along a spiral track to form on the recording medium a series of adjacent bands. Each band comprises a plurality of track convolutions. Track convolutions in each band are recorded at a focus setting on the recording beam which is different by known increments from the focus setting of the beam when track convolutions in respective bands adjacent thereto are recorded. The best focus conditions are obtained at the focus setting of the recording beam forming the brightest band. By comparing the position of that band relative to the position of the band formed by the recording beam at the focus setting at which information is recorded, an accurate determination of the focus conditions thereat is readily obtained from the known increments of focus settings.

14 Claims, 3 Drawing Figures

METHOD AND APPARATUS FOR DETERMINING FOCUS CONDITIONS

The present invention relates in general to radiant energy recording systems and in particular to means for determining focus accuracy of a radiant energy recording beam.

In one illustrative process of producing a video disc record having spiral grooves, such as a video disc of the type described in U.S. Pat. No. 3,842,194 issued to Jon K. Clemens, a disc master (to be used for recording) is formed by (1) mechanically cutting a spiral groove of a trapezoidal cross-section in a copper-coated aluminum disc, and (2) coating the grooved surface with electron beam sensitive material. The coated disc is then mounted on a turntable of an electron beam recorder in the path of a finely focused beam of electrons, that is turned on and off in response to a recording signal representative of video and audio information to expose various portions of the groove bottom as the disc is rotated and translated with respect to the impinging beam to form signal elements. Those portions of the groove bottom struck by the electron beam are removed by subsequent development of the sensitive material. After exposure and development, the master disc has the relief pattern that is desired for the final records. Molds for making stampers for producing production line records are made from these masters. In the final stages of manufacturing a video disc, a vinyl substrate is formed with the desired relief pattern, using a stamper made from a mold, the substrate is coated with a metal by a vacuum sputtering process; the metal is coated with a styrene dielectric by a glow discharge process; and the styrene is coated with a layer of oil by an evaporation process.

In such processes for manufacturing a video disc record, such as the type supra, formulation of a disc master free of significant variations in the focus of the electron beam is an important factor for obtaining high quality video signal recordings. The earliest detection of significant variations in the focus of the electron beam can be a critical factor in improving the yield of quality video records in production runs.

Pursuant to the principles of the present invention, the focus condition of a beam of radiant energy impinging on a recording medium can be readily ascertained through the recording of test signals along a spiral track to form, on the recording medium, a series of adjacent bands, each comprising a plurality of track convolutions, while varying the focus of the beam (e.g., by varying the crosssection of the beam in the plane of the record), by known increments from one band to the other. The test signals form, after development of the disc master, a series of closely spaced fine optical gratings. The gratings formed by an in-focus beam will reflect light more efficiently than those gratings made with an out-of-focus beam and, therefore, the band containing the gratings formed with the in-focus beam will appear "brighter" upon examination, by a suitable means such as a 60X light microscope, than those bands whose gratings were formed with the respective out-of-focus beams. Since the focus setting of the beam forming the first one of the bands is known and since the increments of focus variations are also a known quantity, location of the brightest band relative to the location of the band formed by a beam at the desired operating focus readily enables an estimation of the focus conditions at the operating focus (i.e., the focus setting at which the video and audio information is recorded). The operating focus, which desirably should form the brightest band, can therefore be incremented in a complementary manner by the known increments of focus separating the band formed thereby from the brightest band to achieve proper operating focus.

In further accordance with the principles of the present invention two series of bands are formed on each disc master; one at the start of recording operations and another at the end of recording operations. Examination of the first series of bands determines whether proper operating focus was initially achieved, while examination of the second series of bands determines whether the operating focus was substantially maintained during information recording. Where variations in operating focus during a recording, as determined by examination of the second series of bands, exceed a given value, indicative of serious deterioration in the quality of recorded information, that master can be readily eliminated from the production run.

In accordance with one aspect of the present invention, each series of adjacent bands comprises an odd number of bands with the outer bands and the middle band being recorded at the operating focus to enable ready identification. Moreover, with the bands respectively intermediate the mid band and each of the outer bands being recorded at focus conditions which incrementally vary from the focus of the mid band in relation to their location with respect to the mid band, the amount of variation of the operating focus from an in-focus condition is easily estimated.

In accordance with yet another aspect of the present invention one of the outer bands is provided with a width which is greater than the width of any of the other bands, thereby enabling speedy identification of that band to provide a reference for the increments of focus variations (e.g., whether the increments of focus variations add to or subtract from the focal distance).

In accordance with yet another aspect of the present invention, adjacent bands are separated by "blank regions", of substantially uniform width, where no signal information is recorded. These blank regions enhance the brightness contrast between adjacent bands to thereby improve the sensitivity of the method of focus conditions determination.

In accordance with one embodiment of the present invention, a radiant energy recording system comprises an apparatus which automatically effects the recording of a series of adjacent bands at incrementally different focus conditions. The apparatus comprises a source of clock signals, a counter and binary to digital decoders. The decoders effect the consecutive energizing of a series of relays. The relay outputs are coupled to the lens focus control mechanism of a recording apparatus, and as each relay is consecutively energized the focus setting of the lens is incrementally changed. During transition periods from one focus setting to the next focus setting, one output of the apparatus effects beam attenuation in a manner which assures that no signal information is recorded. The apparatus provides a recording signal for the bands which is derived from the clock signals.

IN THE ACCOMPANYING DRAWING

Figure 2:
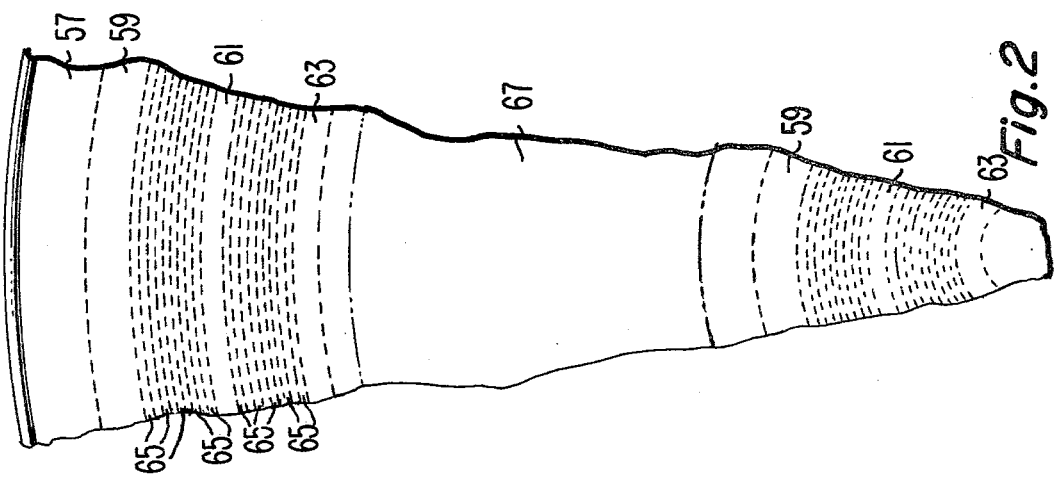
Figure 1B:
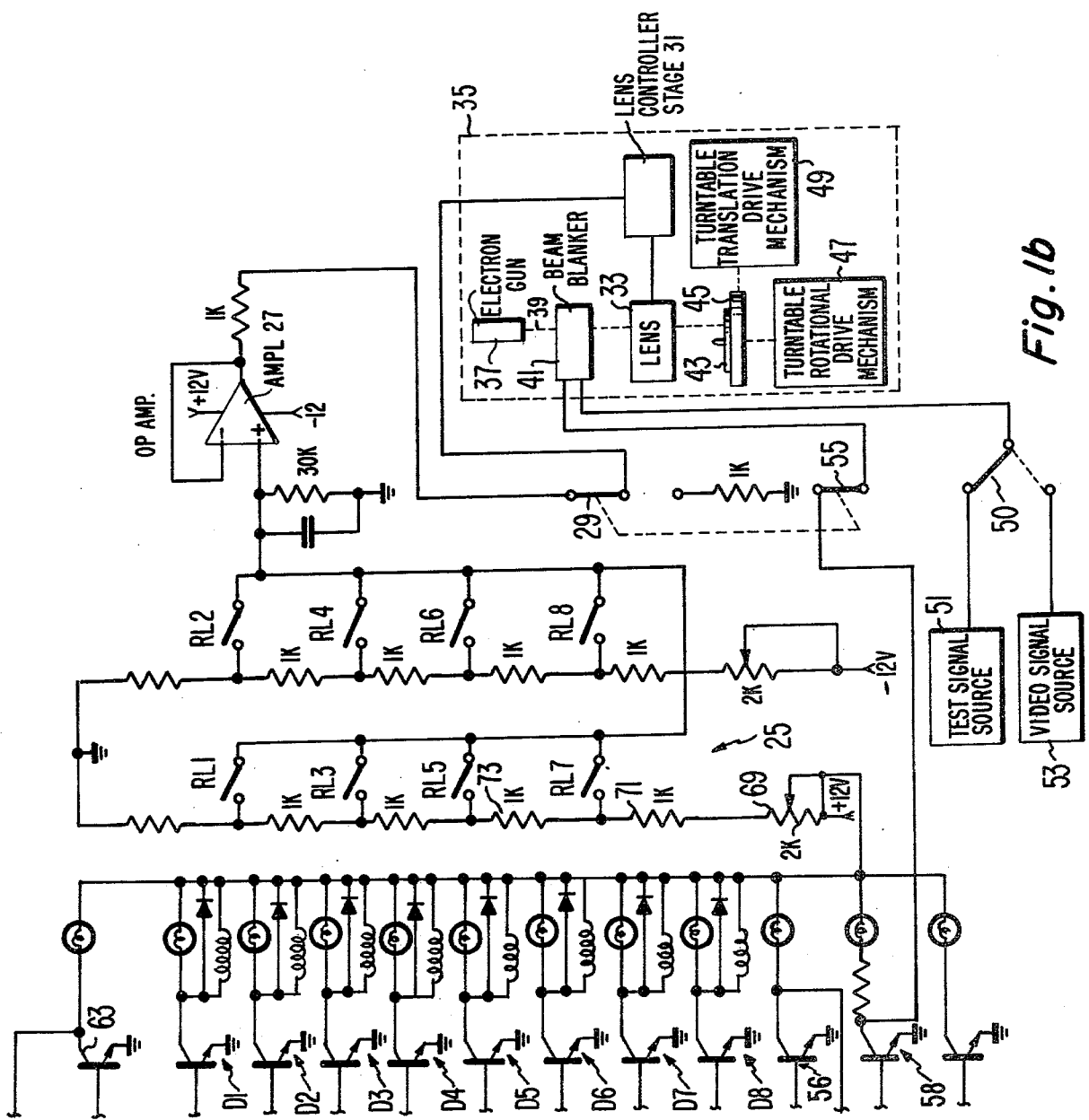

FIGS. 1a and 1b illustrate partially schematically and partially by block diagram a disc recording apparatus in accordance with one embodiment of the present invention; and FIG. 2 illustrates boundaries of markings, which markings serve to indicate focus conditions produced on a record disc by operation of the recording apparatus of FIG. 1.

In the arrangement shown in FIGS. 1a and 1b, a timer 11 normally provides a train of pulses at a constant output frequency (e.g., 10 KHz). A dual flip-flop stage 13 receives the train of pulses and provides a clocking signal to a counter 15. A pair of binary-to-digital decoders 17, 19, which receive the output signals of the counter 15, provide in response thereto sequential energization of their respective output terminals, designated a through l in FIG. 1a. Terminal 1 is coupled to one input of the dual flip-flop 13 to effect a reset of the flip-flop 13 so that at the end of one cycle of operation of the apparatus (i.e., the sequential energizations of output terminals a through l), the apparatus may be ready for a repeat cycle of operation through the closing of a manual "start" switch 21. A manual "reset" switch 23 is also provided so that the sequential energization process may be interrupted and restarted from the top of the sequence.

Output terminals a through k of decoders 17, 19, are coupled, in accordance with one embodiment of the present invention, through diodes, to relay drive stages designated D1 through D8 in FIG. 1b. The associated relays, respectively designated RL1 through RL8, in turn, when energized, couple, through their respective contacts, different resistive elements of a d.c. voltage divider network 25 to one input of an amplifier stage 27. It will be appreciated that as each different resistive element of voltage divider network 25 is coupled to the input of amplifier 27, corresponding, different d.c. drive voltages will be applied to the input of amplifier 27.

The output of amplifier 27 is coupled through a switch 29 to an input of a lens control stage 31 which controls the current in a final focusing lens 33 (e.g., of a type shown in U.S. Pat. No. 4,010,318) in accordance with the voltage output of amplifier 27. Lens control stage 31 and lens 33 form part of a radiant energy recording system 35 which also comprises a source of radiant energy, such as a source of electrons 37 (e.g., an electron gun of a type shown in U.S. Pat. No. 3,999,807) arranged so that its output beam 39, after passing through a beam blanker stage 41, is focused by lens 33 on an electron sensitive surface of a disc 43 supported on a turntable 45. A turntable rotational drive mechanism 47, in cooperation with a turntable translational drive mechanism 49, provide relative motion between the beam 39 and the record 43 in a manner causing beam 39 to inscribe a spiral path on the electron sensitive surface of the record 43. Reference may be had to U.S. application Ser. No. 701,416, filed on June 30, 1976, for John Reisner, et al., now U.S. Pat. No. 4,074,313 for a description of electron beam disc recorder apparatus and systems which provide means for verifying and controlling the size, shape, current density, current distribution, and focusing of the electron image at the resist coated surface of a stationary disc master.

The beam blanker 41 receives, through switch 50, the outputs of a test signal source 51, during test band recordings, and of a video signal source 53, during information recording. It will be appreciated that the beam 39 will be modulated by blanker stage 41 between an on level causing removal of exposed sensitive material upon subsequent development of record 43 and an off level insufficient to cause removal of exposed sensitive material upon subsequent development of record 43. Therefore, the recorded information will appear, upon development of the resist layer, as a spiral path formed of alternating depressed and non-depressed sections, respectively corresponding to on level exposure and off level exposure areas of the electron sensitive material. The test signal source 51 may provide, for example, a train of cyclically recurring bursts of carrier waves with each burst comprising carrier waves at a particular frequency (e.g., 5 MHz) to effect, upon development of the resist layer, and the illumination thereof, a spiral path formed of "bright" sections, corresponding to the recordings of a burst of carrier waves, alternating with "dull" sections where no burst of carrier waves is recorded. The rate of burst recurrence is such as to provide relative grouping of the "bright" sections along radial lines of the disc whereby relatively straight gratings are formed. The video signal source 53 may provide, for example, a carrier signal modulated by a video signal of a type explained in U.S. Pat. No. 3,986,788 to Clemens.

An additional input of blanker 41 is provided, through switch 55, by a driver stage comprising transistors 56 and 58 controlled by the output from pins 2 and 5 of dual flip-flop 13. This output effects attenuation, in blanker 41, of the beam 39 for a time period which encompasses transitions in the sequential energization of output terminals a through l. This attenuation of the beamlevel prevents undesired recordings of test signals while the lens 33 is changing focus settings.

One cycle of operation of the apparatus of FIG. 1 will now be described. For purposes of explanation it may be assumed that a record 43 of the type described above, is placed on turntable 45. The voltage to controller 31 is manually selected, for example, in accordance with one of the systems described in the aforementioned Reisner, et al. application, to provide an operating focus current setting for the lens 33, which setting will therefore be the setting corresponding to a zero voltage output of amplifier 27. Ganged switches 29, 55 are closed and the reset switch 23 is momentarily closed to assure that apparatus operation will start at the beginning of the energization sequence of terminals a through l. It may be further assumed that test signal source 51 is providing its proper output to blanker stage 41 and that electron gun 37 is turned on. Turntable drive mechanisms 47 and 49 are then energized and immediately thereafter start switch 21 is closed. This will start the sequence of energization of terminals a through l.

With terminal a energized, no relays are energized and the test signals are recorded at the operating focus setting. It will be appreciated that energization of terminal a effects conduction of a transistor 63 with concomitant grounding of the anode of a diode 65 removing the +12 volt supply of voltage divider network 25 from the timer 11 circuit. This reduces the current level which charges a capacitor 67 and the resulting longer charging time effects a modification of the period of the output of the timer thereby causing test bands recorded in the operating focus setting to be wider (e.g., contain a larger number of track convolutions) than other bands. It will be further appreciated that initially the charge level on capacitor 67 will be zero whereas during normal operations the capacitor charge level which controls the timer period alternates between ⅓ and ⅔ of the full charge level. Therefore, the first band to be recorded will have the largest width of all the recorded bands with the increase in width corresponding to the additional charge time required.

After a given time duration, determined by the operation of flip-flop 13, the energization of terminal a is ceased while the energization of terminal b is initiated. Concomitant with such change in terminal energization, beam 39 is attenuated by one output of flip-flop 13, in the aforementioned manner. Since this attenuation occurs at each transition in terminal energization a description thereof will not be further repeated.

With terminal b energized, the contacts of relay RL7 will close and thus couple the +12 volt source of voltage divider network 25, through potentiometer 69 and resistor 71, to the input terminal of amplifier 27. This has the effect of energizing controller stage 31 in a manner providing a new focus setting for lens 33 which is, in the present embodiment of the invention, 20 microns away from the operating focus setting in a direction which increases the distance between the focal distance between lens 33 and the surface of record 43 (hereinafter called a negative direction). In a similar manner, with the subsequent energization of terminal c, the contacts of relay RL5 will close to thus couple the +12 volt source of the voltage divider network 25, through resistors 69, 71 and 73, to the input terminal of amplifier 27. This, again, has the effect of energizing controller stage 31 in a manner which provides yet another focus setting for lens 33 which is negative 15 microns away from the operating focus setting. Similarly, energization of terminals d and e will cause energization of respective relays RL3 and RL1 which ultimately cause the lens 33 to respectively assume new focus settings of a negative 10 and a negative 5 microns away from the operating focus setting. With energization of terminal f, no relays are energized and the lens 33 resumes its operating focus setting.

In a fashion similar to that described with reference to terminals b through e, energization of terminals g through j causes energization of respective relays RL2, RL4, RL6 and RL8 to ultimately cause the lens 33 to respectively assume new focus settings of 5, 10, 15 and 20 microns away from the operating focus setting in a direction which decreases the focal distance between the lens 33 and the surface of record 43 (hereinafter called a positive direction). Energization of terminal k effects a return of the setting of lens 33 to its operating focus condition while the subsequent energization of terminal 1 effects a termination of the operation of the apparatus as previously described.

It will be appreciated that as the apparatus of FIGS. 1a and 1b goes through one cycle of sequential energization of terminals a through l, record 43 will comprise a series of adjacent bands on the recording medium. Each band is recorded at a focus setting of the recording beam which is different by known increments from the focus setting of the beam when bands adjacent thereto are recorded. FIG. 2 illustrates a section of a record medium 57 developed by the apparatus of FIGS. 1a and 1b and comprising two series of adjacent bands with the boundaries of each band being formed by lateral parallel dash markings which illustrate the relative widths of the bands. Bands 59, 61 and 63, which are recorded at the operating focus are relatively wider than the other bands recorded at focus settings deviating from the operating focus setting. Band 59, being the first band recorded in each series. The bands in each series are separated by regions 65 where no signal information is recorded. Area 67 of the record medium 57, located intermediate the areas respectively occupied by the series of adjacent bands is reserved for the recording of desired signal information.

With reference again to FIG. 1b, it will be appreciated that subsequent to the recording of a series of bands the output of test signal source 51 is removed from the input to blanker 41 and in its stead the output of video signal source 53 is applied to the input of blanker 41. Ganged switches 29, 55 are also moved to their open position to thus enable operation of recorder system 35 in its normal recording mode. After video information has been recorded on record 43 a second series of bands may again be recorded on record 43.

A simple optical examination of these series of bands provides an indication of the quality of the recorded video information. Since the best focus conditions are obtained at the focus setting of the recording beam forming the brightest band, a comparison of the position of that band relative to the position of the band formed by the recording beam at the operating focus enables an accurate determination of the focus conditions at the operating focus which determination is readily obtained from the known increments of focus settings. Inspection of the second series of bands determines whether proper focus setting, if initially established, has been maintained throughout video information recording.

What is claimed is:

1. A radiant energy beam recording method for obtaining a measure of the focus setting of a radiant energy recorder comprising the steps of:

providing a recording beam of radiant energy;

positioning a radiant energy sensitive record medium relative to said recording beam in a manner causing the record to laterally intersect said recording beam;

establishing a focus setting for said recording beam in a manner causing a spot to be formed on the surface of said record;

establishing relative motion between the record and the recording beam in a manner effecting exposure to the recording beam of selected regions on a first major area of the record surface defining a series of adjacent test bands, the structure of said bands serving as an optical grating, varying said focus setting such that each of said selected regions in each band is exposed at an axial location of the recording beam which is respectively different from the axial location of the recording beam at which said selected regions in respectively other bands are exposed; and examining the light reflected by the optical gratings of said bands to obtain a measure of the optimum focus setting for said recording beam.

2. The method in accordance with claim 1 wherein said relative motion establishing step further comprises the step of:

causing each of the axial locations at which said selected regions in each band are exposed to the focused beam to be different by a uniform increment of distance from the axial locations at which said selected regions in the respective bands adjacent thereto are exposed.

3. The method in accordance with claim 1 further comprising, during transitions between the different axial locations of the beam, the step of:

attenuating the beam intensity.

4. The method in accordance with claim 1 further comprising, after said relative motion establishing step, the steps of:

establishing relative motion between the record and the beam in a manner effecting exposure to the recording beam at the chosen focused setting of selected regions on a second major area of the record surface; and establishing relative motion between the record and the recording beam in a manner effecting exposure to the recording beam of selected regions on a third major area of the record surface, with said second major area being intermediate said first named major area and said third major area, defining a series of adjacent bands, the structure of said bands serving as an optical grating, where each of said selected regions in each band is exposed at an axial location of the recording beam which is respectively different from the axial location of the recording beam at which said selected regions in respectively other bands are exposed.

5. The method in accordance with claim 1 wherein said relative motion establishing step further comprises the step of:

effecting the exposure of selected regions in each of said bands in a manner causing the width of some of the bands to be large relative to the width of the other bands.

6. A radiant energy beam recording method for obtaining a measure of the focus setting of a radiant energy recorder comprising the steps of:

providing a recording beam of radiant energy;

positioning a radiant energy sensitive record medium relative to the recording beam in a manner causing the record to laterally intersect the recording beam;

establishing a chosen focus setting for said recording beam in a manner causing a spot to be formed on the surface of the record;

establishing relative motion between the record and the recording beam in a manner effecting exposure to the recording beam of selected regions, on a first major area of the record surface, defining a series of adjacent bands, the structure of said bands serving as an optical grating;

varying, from said chosen focus setting, the focus setting of said recording beam in a manner causing each of said selected regions in each band to be respectively exposed at a known focus setting of the recording beam which is different from the focus setting at which the selected regions of bands adjacent thereto are exposed; and examining the light reflected by the optical gratings of said bands to obtain a measure of the optimum focus setting for said recording beam.

7. The method in accordance with claim 6 wherein said focus setting varying step comprises:

varying the focus setting of said beam in a manner causing the selected regions in each of said bands to be exposed to the beam at a focus setting of the beam which differs by a uniform increment of focus setting from the focus setting at which the selected regions in bands adjacent thereto are exposed.

8. The method in accordance with claim 6 further comprising, during transitions between the different focus settings of the beam, the step of:

attenuating the beam intensity.

9. The method in accordance with claim 6 wherein said relative motion establishing step further comprises the step of:

effecting the exposure of selected regions in each of said bands in a manner causing the width of some of the bands to be large relative to the width of the other bands.

10. The method in accordance with claim 6 further comprising, after said focus setting varying step, the steps of:

establishing relative motion between the record and the recording beam in a manner effecting exposure to the recording beam at the chosen focused setting of selected regions on a second major area of the record surface;

establishing relative motion between the record and the recording beam in a manner effecting exposure to the recording beam of selected regions on a third major area of the record surface, with said second major area being intermediate said first and third major areas, defining a series of adjacent bands, the structure of said bands serving as an optical grating; and varying, from said chosen focus setting, the focus setting of said recording beam in a manner causing each of said selected regions in each band in said third major area to be respectively exposed at a known focus setting of the recording beam which is different from the focus setting at which the selected regions of bands adjacent thereto are exposed.

11. Apparatus, for obtaining a measure of the focus setting of a radiant energy recorder, comprising:

means for providing a recording beam of radiant energy;

means for modulating said recording beam with a test signal of a given frequency;

means for focusing said modulated recording beam on a surface of a record medium; said surface being sensitive to said modulated recording beam; said focusing means being adjustable for changing the axial location of a given cross-section of said modulated recording beam;

means for establishing relative motion between said modulated recording beam and said record medium in a manner causing an exposure, by said modulated recording beam, of the surface of said record medium; and means for effecting sequential adjustments of said focusing means during the occurrence of said relative motion in a manner causing said modulated recording beam to expose the surface of said record medium in a series of adjacent test bands wherein each of said adjacent bands is exposed by said modulated recording beam at a different axial location of said modulated recording beam, the structure of said bands serving as an optical grating;

whereby the optimum modulated recording beam focus setting in said series of adjacent test bands is indicated by that test band which provides the most efficient light reflection.

12. The apparatus in accordance with claim 11 wherein said means for effecting sequential adjustments comprises:

a source of clock signals having a normally constant frequency output;

means, coupled to the output of said source of clock signals and having a plurality of terminals, for effecting sequential energization of said plurality of terminals;

means for coupling different ones of a plurality of values of potential, in response to the energization of respective ones of said plurality of terminals, to said focusing means to thereby effect adjustments in the axial location of said modulated recording beam.

13. The apparatus in accordance with claim 12 wherein said means for effecting sequential adjustments further comprises:
means for altering the frequency output of said source of clock signals in response to the energization of one of said plurality of terminals in a manner causing bands recorded while said one of said plurality of terminals is energized to be larger in width than the other bands in said series of adjacent bands.

14. The apparatus in accordance with claim 12 further comprising:
selectively actuated means, interposed between said recording beam providing means and said record medium, for selectively attenuating the modulated recording beam intensity; and wherein
said sequential adjustment effecting means further comprises means for activating said attenuating means during intervals of transition of energization from one to another of said plurality of terminals.

* * * * *